United States Patent [19]

Workman

[11] Patent Number: 4,817,794

[45] Date of Patent: Apr. 4, 1989

[54] VERSATILE MULTIPLE USE SHIM PRODUCT

[75] Inventor: Gary L. Workman, Lombard, Ill.

[73] Assignee: Deslauriers, Inc., Bellwood, Ill.

[21] Appl. No.: 119,979

[22] Filed: Nov. 13, 1987

[51] Int. Cl.$^4$ .............................................. B65D 85/28
[52] U.S. Cl. ..................................... 206/372; 206/820
[58] Field of Search ................................ 206/820, 372

[56] References Cited

U.S. PATENT DOCUMENTS

| | | | |
|---|---|---|---|
| 2,913,102 | 11/1959 | Dennoyer | 206/820 |
| 2,928,100 | 3/1960 | Gagnon | 206/820 |
| 3,377,904 | 4/1968 | Olson | 206/820 |
| 3,892,902 | 7/1975 | Ilukowicz | 206/820 |
| 4,026,413 | 5/1977 | Britt et al. | 206/820 |
| 4,361,935 | 12/1982 | Paxton | 206/820 |
| 4,684,022 | 8/1987 | Potucek | 206/820 |

OTHER PUBLICATIONS

Pages (15) and (15-1) of Deslauriers, Inc. price list published at least as of Mar. 1, 1986.

*Primary Examiner*—Joseph Man-Fu Moy
*Attorney, Agent, or Firm*—Wood, Dalton, Phillips, Mason & Rowe

[57] ABSTRACT

A multiple use shim product having plural rows of spaced-apart shims, with the shims being integrally-connected to adjacent shims in the same row as well as adjacent rows by relatively thin and narrow fracturable hinge sections. The shim product is of a one-piece construction formed as a molded sheet of plastic material. Each shim is of generally a horseshoe shape with a space between separated legs. The shims are arranged in adjacent rows wherein separation of two particular rows of shims from the sheet can have the shim spaces opening outwardly from each row of shims and another selection of rows of shims can have the shim leg sections abutting to form an elongate enclosed opening by the combined spaces.

7 Claims, 2 Drawing Sheets

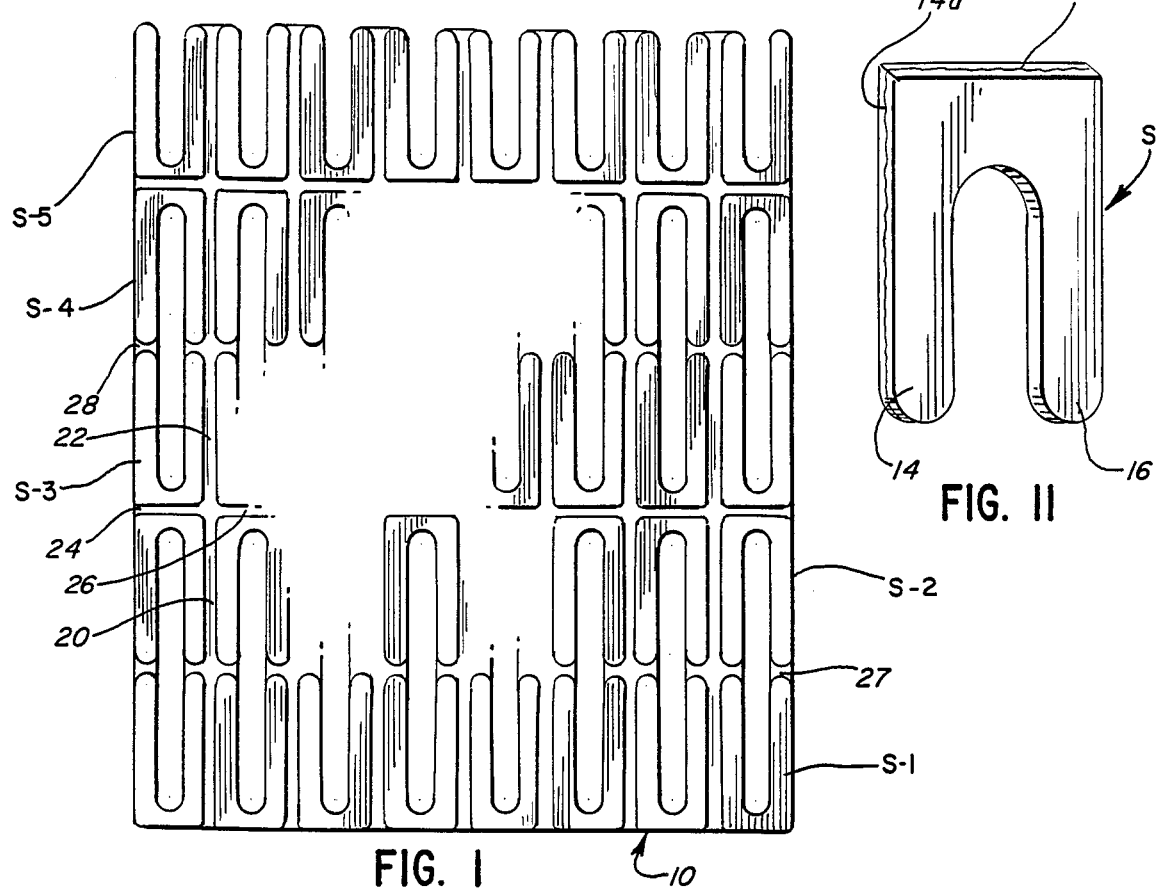
FIG. I
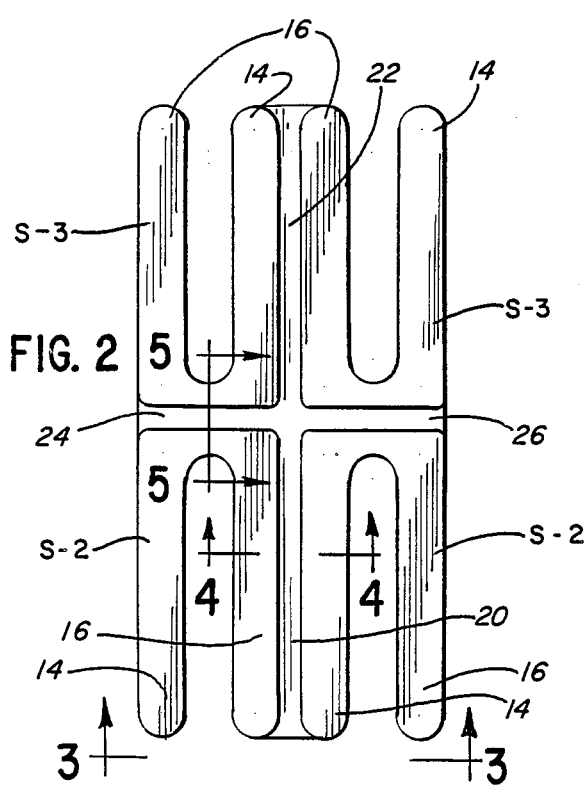
FIG. 2
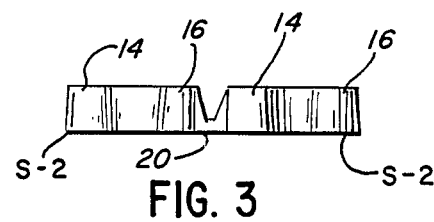
FIG. 3
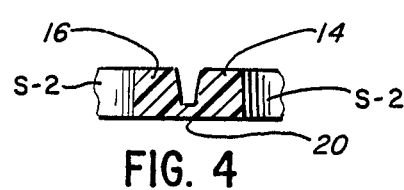
FIG. 4
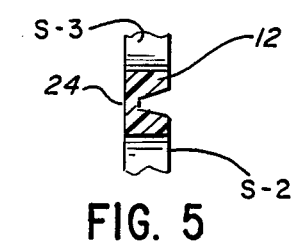
FIG. 5

VERSATILE MULTIPLE USE SHIM PRODUCT

DESCRIPTION

FIELD OF THE INVENTION

This invention relates to a versatile multiple use shim product. The shim product comprises a plurality of integrally-connected, individual shims arranged in spaced parallel rows and with individual shims interconnected by fracturable integral hinge sections enabling folding of an entire sheet or a portion of a sheet of shims to a desired configuration. The hinge sections are fracturable by flexing to provide a usable shim of a desired configuration from one or ore of the hingedly-connected individual shims. The shims have varied uses primarily in the concrete construction field to provide for levelling of precast wall panels; shimming of building components, such as window and door frames; and as pads for use in storing building components, such as flat supporting pads and hanger pads which extend around the corner of a building component.

BACKGROUND OF THE INVENTION

The requirement for shims is well known in the building construction industry. A common type of shim used for generations and known to people generally is the shim provided by a piece of wooden shingle. A wooden shingle has a taper and a shingle section can be inserted into the space between a window or door frame and a building wall to obtain accurate alignment of the frame with the wall.

Commonly, the shims used in the concrete construction field are made of a plastic material having substantial compressive strength and which will not rust, stain or leach. Suppliers of such shims have a number of standard products including rectangular shims available in different sizes and thicknesses. A rectangular shim is available which is shipped in strip form with individual shims being detachable from the strip by breaking the shim off from the strip at a score line. This shim strip is formed by an extrusion process and, after the product has been extruded, the strip is scored to provide the score lines between shims.

Another form of commercially-available shim is in the shape of a horseshoe wherein there is a space between a pair of legs to enable one or more of the shims to be mounted on a rod used in the construction. The shim can be of uniform thickness or be tapered.

There are many instances wherein commercially-available shims, such as those described in the preceding paragraphs are not suitable for use and an architect or builder will request a shim supplier to provide a special order of shims having the required dimensions and thickness as well as specifically-located slots or openings. Such special order shims are, of course, more expensive and it would be desirable to have a versatile multiple use shim product having a number of shims sized and arranged whereby a user may use an entire sheet of shims or parts thereof to meet the particular requirement.

SUMMARY OF THE INVENTION

A primary feature of the invention is to provide a versatile multiple use shim product comprising a sheet of plastic material having a plurality of rows of shims with each shim having a pair of legs with a space therebetween and with the shims in certain of the adjacent rows being related to have the spaces thereof defining an elongate single opening and adjacent shims in each row as well as in adjacent rows being interconnected by relatively thin and narrow fracturable hinge sections integral therewith whereby adjacent rows of shims may be folded onto each other or with flexing of the hinge sections the hinge sections may be fractured to separate one or more shims from the remainder.

An object of the invention is to provide a versatile multiple use shim product comprising, a molded sheet of plastic material having a plurality of rows of shims with each shim having a pair of legs with an opening therebetween and integrally connected to adjacent shims in the same row as well as adjacent rows by relatively thin and narrow fracturable hinge sections of said plastic material.

Another object of the invention is to provide a versatile multiple use shim product as defined in the preceding paragraph wherein at least two adjacent rows of shims are arranged in a mirror image relation to have opposed shims in the adjacent rows define a rectangle with an elongate enclosed opening.

Still another object of the invention is to provide a versatile multiple use shim product as defined in the preceding paragraphs wherein said sheet has at least one row of shims with the openings between the legs opening to the edge of the sheet.

DESCRIPTION OF THE DRAWINGS

FIG. 1 is a plan view of the shim product with a central part thereof omitted;

FIG. 2 is a fragmentary portion of the sheet shown in FIG. 1 and on an enlarged scale;

FIG. 3 is an end view of the shim product portion shown in FIG. 2 and taken in the direction of the line 3—3 in FIG. 1;

FIG. 4 is a fragmentary section taken generally along the line 4—4 in FIG. 2;

FIG. 5 is a fragmentary section taken generally along the line 5—5 in FIG. 2;

FIG. 11 is a perspective view of a single shim removed from the shim product shown in FIG. 1.

DESCRIPTION OF THE PREFERRED EMBODIMENTS

Figure 7:
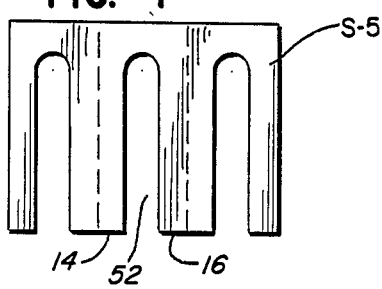
FIG. 7 is a view similar to FIG. 2, showing a different arrangement of shims taken from the sheet of the first embodiment as a replacement for the shim shown in FIG. 7A.
Figure 10:
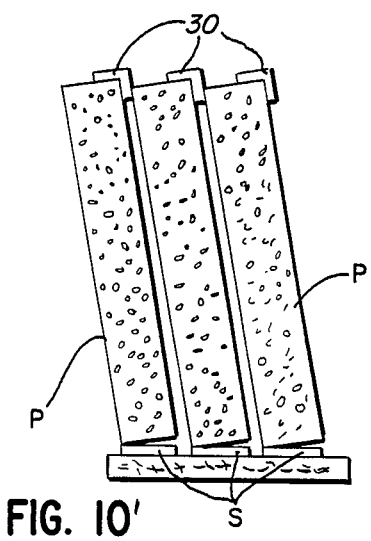
FIG. 10 is a side elevational view of a stored set of wall panels with sections of shim product being used as both a flat pad and a hanger pad.

A first embodiment of the versatile multiple use shim product is shown in FIGS. 1 to 5, and with uses of the product illustrated in FIGS. 7 and 10.

The shim product is formed as a sheet, indicated generally at 10, of molded plastic material. The material is preferably polystyrene. However, other plastic materials, such as polypropylene, can be used, with the primary requirement that the plastic material have substantial compressive strength and not rust, stain or leach or be affected by alkali or ground chemicals. The shim product is formed by plastic injection molding in a single operation and results in plural rows of interconnected shims. As seen in FIG. 1, there are transverse rows of shims S-1, S-2, S-3, S-4 and S-5. The shims are also arranged in rows normal to the transverse rows. Each of the shims S is of a horseshoe shape, as seen in FIG. 11, wherein the shim S has a base section 12 with a pair of spaced-apart legs 14 and 16 extending therefrom and defining a space therebetween which is open at the free ends of the legs 14 and 16. Hinge section fractures are shown at 12a and 14a.

All of the shims molded in the sheet 10 are integrally connected to adjacent shims in the same row as well as adjacent rows by relatively thin and narrow fracturable hinge sections of the plastic material. Referring particularly to FIGS. 2 to 5, the adjacent legs 14 and 16 of a pair of shims S-2 in a row are integrally connected by a hinge section 20, with there being a hinge section 22 between the legs 14 and 16 of a pair of shims S-3. The connection between the base sections of shims S-2 and S-3 of adjacent rows is provided by hinge sections 24 and 26. The ends of the legs of the shims S-1 and S-2 and S-3 and S-4 are connected by hinge sections 27 and 28, respectively.

The present commercially available shims normally range in thickness from 1/16" to ¼", with the width dimension across the base section 12 ranging from 1-3" and with the height of the shim ranging from 2-4" and with some variation in the spacing and the shape of the space between the legs 14 and 16. With the appropriately-shaped molds, a series of different sheets 10 can be injection molded to meet the dimensional requirements for shims. The shims of any one sheet 10 would all have the same shape and dimensions.

The thickness of the hinge section, which in effect defines a score line for separation of shims from each other, can vary within limits and, normally, is generally in the range of, 0.02–0.03".

The integral hinge sections have a V shape, as seen particularly in FIGS. 3–5, whereby one or more adjacent rows of shims may be folded back-to-back at the score lines to a double thickness or folded to a right angle relation. Such uses of an entire or partial sheet of shims is shown in FIG. 10 wherein a plurality of wall panels P may be safely stored by one or more rows of shims S forming flat pads under the panels and at least two rows of shims, such as rows S-1 and S-2 being folded to a right angle relation to form hanger pads 30.

Flexure back and forth at the score lines enables fracturing of the hinge sections to separate one or more shims from the sheet and from each other.

The versatility and multiple use of the shim product is illustrated in FIGS. 6, 7, 8, 9 and 9A. This versatility is enhanced by the shim arrangement. Initial selection of shims is aided by having a border row of shims S-5 with outwardly-opening spaces and a border row of shims S-1 with inwardly-opening spaces. As is obvious from the foregoing description, there are no hinge sections extended across the space between the free ends of the shim legs.

Figure 6:
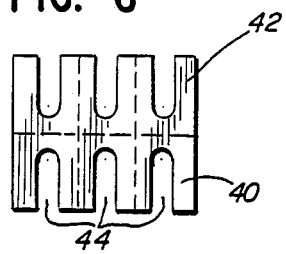
FIG. 6 is a view, similar to FIG. 2, showing a section of a second embodiment of the shim product.
Figure 6A:
FIG. 6A shows a prior art special order shim.

Two partial rows of shims 40 and 42 are shown in FIG. 6 which have been taken from a shim product of a second embodiment which only varies from the first embodiment in the dimensions of the shims. These shims are selected from a shim product of the desired thickness to match the thickness of the prior art shim shown in FIG. 6A and have spaces 44 between the legs of the shims 40 to provide equivalency to the spaces 46 in the prior art shim 48. The partial second row of shims 42 contributes to the overall dimensional configuration of the prior art shim 48.

For simplicity, in FIG. 6 as well as in the other illustrative Figures, FIGS. 7, 8, 9 and 9A, the score line provided by the hinge sections between shims is shown by broken line. However, it will be noted that the hinge elements have not been fractured, so that the plural shims constitute a unitary structure.

Figure 7A:
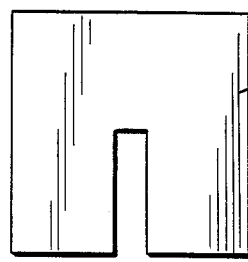
FIG. 7A is a plan view of a special order prior art shim.

In FIG. 7, a plurality of shims S-5, taken from the sheet of FIG. 1, provide an overall dimension approximately that of the prior art shim 50 shown in FIG. 7A. A space 52 between legs 14 and 16 of the central shim provides the equivalent of the space 54 required in the prior art shim 50.

Figure 8:
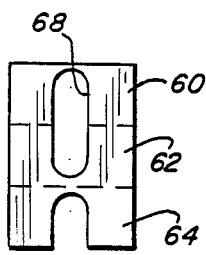
FIG. 8 is a plan view of a plurality of shims taken from a third embodiment of the shim product to replace the special order prior art shim of FIG. 8A.
Figure 8A:
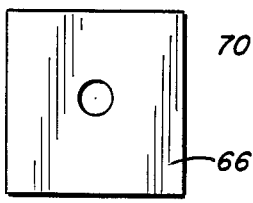
FIG. 8A is a plan view of a special order prior art shim.

In FIG. 8, a third embodiment of shim product has shims of different dimension, with there being three integrally-connected shims 60, 62 and 64 to provide the approximate overall dimension of the prior art shim 66. The shims 60 and 62 are in a mirror-image relation whereby the opening or space between the legs thereof is continuous to define a space 68 which can provide the functional equivalent of the opening 70 in the prior art shim 66.

Figure 9:
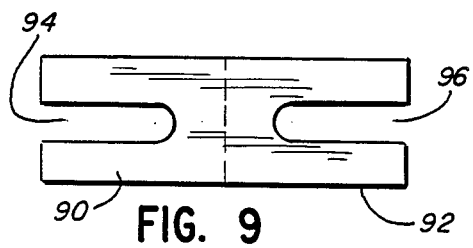
FIG. 9 is a plan view of a section taken from a fourth embodiment of a shim product to replace use of the shim shown in FIG. 9B.
Figure 9A:
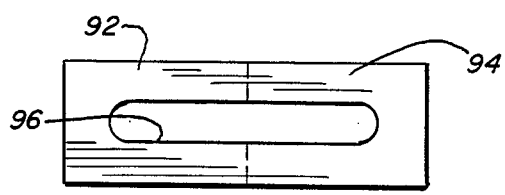
FIG. 9A is a plan view of two differently connected shims from the fourth embodiment also usable to replace the shim of FIG. 9B.
Figure 9B:
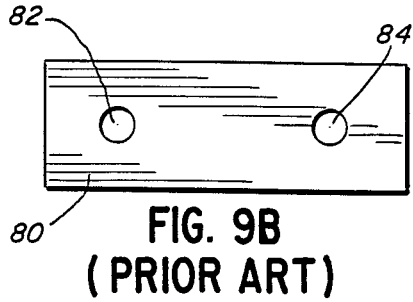
FIG. 9B is a plan view of a special order prior art shim.

Another prior art shim is shown in FIG. 9B. This prior art shim 80 has a pair of openings 82 and 84. The shim product 10 in a fourth embodiment dimensionally differing from that shown in FIG. 1 provides replacement potential for prior art shim 80. This replacement can be achieved in two different ways. One way is shown in FIG. 9 wherein a pair of integrally-connected shims 90 and 92 are connected at their base sections in a mirror-image relation and have the spaces or openings between the legs thereof opening outwardly so that the respective spaces 94 and 96 are equivalent to the openings 82 and 84 of the prior art shim. An equivalent of the prior art shim can also be achieved by a different shim selection from a sheet of the fourth embodiment including the same shim 92 and a second shim 94 which is in a mirror-image relation. The ends of the legs are joined at a score line and with the spaces between the legs defining an elongate enclosed opening 96. FIGS. 9 and 9A demonstrate that there are two different ways to provide a rectangular shim which can either have separate open-ended spaces between the legs of the individual shims or an elongate enclosed opening by the spaces between the legs of adjacent shims being joined together.

Although the various shim product embodiments disclosed herein have shown shims of uniform thickness with spaced-apart legs providing a generally rectangular space therebetween, it is within the scope of the invention to form sheets of tapered shims as well as shims having various shaped spacing, such as a keyhole shape between the legs and these shim products can be made by suitable design of the molds for use in the plastic injection molding operation.

For any particular shape of shim, there can be enough different molds to produce different sheets 10 to meet all the thickness and dimensional requirements.

I claim:

1. A versatile multiple use shim product comprising, a molded sheet of plastic material having a plurality of rows of shims with each shim having a pair of legs with an opening therebetween and integrally connected to adjacent shims in the same row as well as adjacent rows by relatively thin and narrow fracturable hinge sections of said plastic material; and the shims in at least two adjacent rows of shims being arranged in a mirror-image relation to have the openings of opposed shims in the adjacent rows define an elongate enclosed opening.

2. A shim product as defined in claim 1 wherein an outside row of shims has the openings between the legs open to the edge of the sheet.

3. A versatile multiple use shim product comprising, a molded sheet of plastic material having a plurality of rows of shims with each shim having a pair of legs with an opening therebetween and integrally connected to adjacent shims in the same row as well as adjacent rows by relatively thin and narrow fracturable hinge sections of said plastic material; and the shims in at least two of said rows are associated in mirror-image relation whereby the openings of opposed shims extend in opposite directions.

4. A shim product as defined in claim 3 wherein each shim has a base section from which said legs extend and said fracturable hinge sections are integrally formed between the base sections of said opposed shims and between the outer edges of the legs of said opposed shims.

5. a multiple use shim product comprising, a molded one-piece sheet of a plastic material such as polystyrene or polypropylene or the like having spaced-apart plural rows of spaced-apart shims with each shim having a shape resembling a horseshoe with a base section and pair of spaced-apart legs having a space therebetween, at least two adjacent rows of said shims having opposed shims in a mirror-image relation whereby the ends of the legs of opposed shims are adjacent each other and the spaces thereof define a common opening, at least one row of shims at the edge of the sheet having the spaces thereof open to the perimeter of the sheet and integral fracturable hinge sections holding said rows of shims together in sheet from and enabling either folding of shims onto each other to form a pad or separation of a selected number of shims or rows of shims from said sheet.

6. A shim product as defined in claim 5 wherein said hinge sections interconnect the adjacent base sections of a plurality of adjacent shims in adjacent rows.

7. A shim product as defined in claim 6 wherein there are hinge sections between adjacent legs of a second plurality of shims.

* * * * *